Dec. 27, 1960 J. CLEYBERGH 2,966,358

AUTOMATIC RECORD CHANGER SPEED CONTROL

Filed May 29, 1956 2 Sheets-Sheet 1

*INVENTOR:*
JOHN CLEYBERGH

BY Watson D. Harbaugh

ATT'Y

Dec. 27, 1960

J. CLEYBERGH 2,966,358

AUTOMATIC RECORD CHANGER SPEED CONTROL

Filed May 29, 1956

2 Sheets-Sheet 2

INVENTOR:
JOHN CLEYBERGH
BY Watson D. Harbaugh
ATT'Y

United States Patent Office 2,966,358
Patented Dec. 27, 1960

2,966,358

AUTOMATIC RECORD CHANGER SPEED CONTROL

John Cleybergh, Chicago, Ill., assignor to Webcor, Inc., a corporation of Illinois Filed May 29, 1956, Ser. No. 587,983

9 Claims. (Cl. 274—10)

This invention relates to sound reproducing apparatus and more particularly to an automatic record changer of the multi-speed type in which record tablets of different diameters may be reproduced indiscriminately and wherein the turntable speed may be varied automatically in response to the diameter of the record tablet deposited on the turntable upon initiation of a cycle of automatic operation. This invention is an improvement over the inventions disclosed in the applications of Colin B. Dale, Serial No. 446,469, now abandoned and Edwin S. Bara, Serial No. 552,827, filed December 13, 1955, whose disclosures are incorporated herein by reference.

A principal object of the invention is to provide an automatic record changer of the character described wherein the turntable speed may be varied automatically to accommodate record tablets whose requisite reproducing speeds are characteristic of their diameters.

A further object of the invention is to provide an automatic record changer of the stated type wherein a tone arm control mechanism is indexed to correspond with the diameter of a particular record tablet deposited on the turntable, and in which the automatic speed changing mechanism is coordinated to the position of the tone arm control.

Another object of the invention is to provide an automatic record changer with a plurality of speeds in excess of two wherein certain speeds are selected automatically in accordance to the size of the record tablet and other speeds are selected manually independently of the size of the record tablet.

Another object of the invention is to provide an automatic record changer of the character described which is characterized by convenience in form, ease of manufacture, and efficiency and reliability of operation.

Other and further objects, advantages and features of the present invention will be apparent to those skilled in the art from the following description, taken in conjunction with the accompanying drawings in which similar reference characters relate to similar parts and in which.

Figure 1:
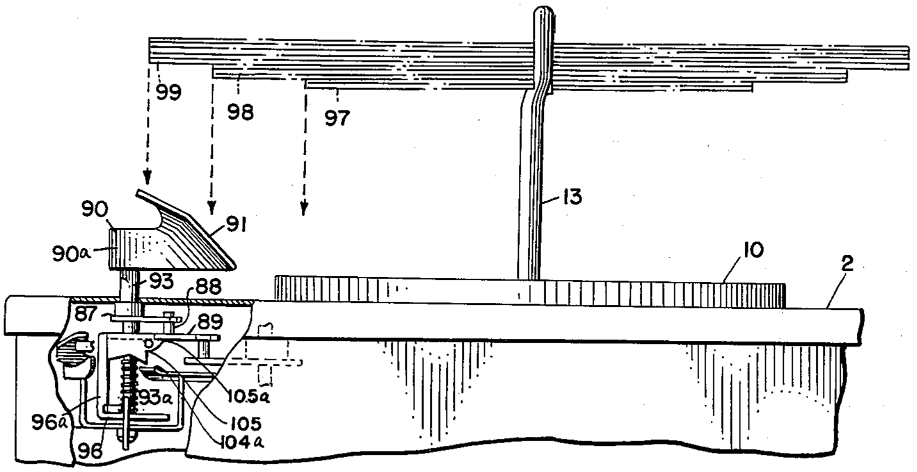
Fig. 1 is an elevational view, partly broken away and partly in section, of an automatic record changer made in accordance with the present invention and showing a portion of the speed control mechanism.
Figure 2:
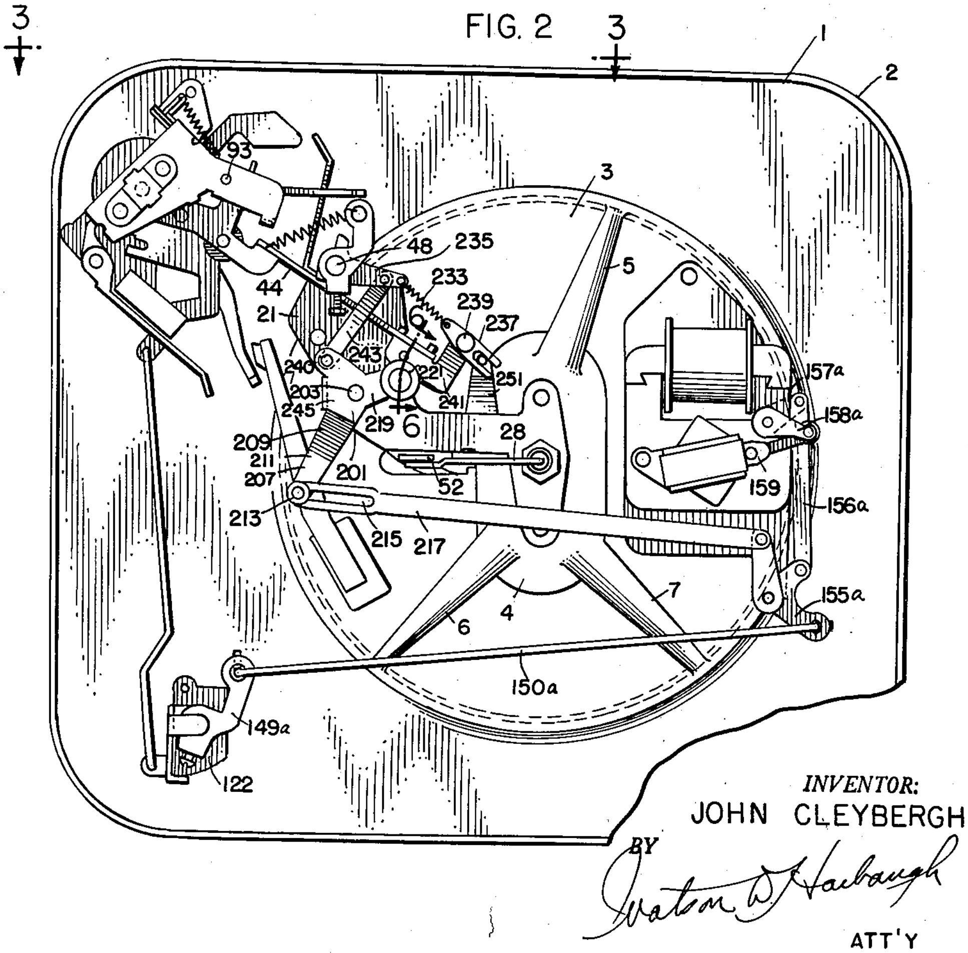
Fig. 2 is a bottom plan view of the record changer of Fig. 1 showing the speed control mechanism in operative position.

Referring now to the drawings and more particularly to Figs. 1 and 2, the automatic record changer of the present invention comprises a motorboard 1 of thin sheet metal stiffened by a marginal flange 2, and having a central well 3 in which a turntable 10 is rotatably mounted about a non-rotating spindle mechanism 13 of the type shown in said Dale application. The central well 3 is provided with an oblong depression 4 connected with the marginal edges of the well by means of a plurality of radially extending channel corrugations 5, 6 and 7.

The lower end of the spindle assembly 13 is connected at one end to a rocker arm 28 pivotally mounted to the undersurface of the motorboard 1 to actuate the record dropping mechanism. The other end of the rocker arm 28 carries a roller 52 which extends through a suitable opening in the motorboard 1 and into engagement with a cam path (not shown) formed on the under side of a main central cam gear 29, shown fragmentarily in Fig. 3. The cam path has a rise surface for cyclic operation of the spindle assembly upon rotation of the cam gear 29. The cam rise is so located as to time the record drop with a series of operations which include the initiation of rotation of the cam gear 29 at the termination of the reproduction of a record, raising a tone arm (not shown) to a substantially horizontal position, swinging the tone arm outwardly to its limit position, and swinging the tone arm inwardly to a position corresponding to the initial reproducing position of a record of a particular diameter. For the latter purpose, an indexing assembly 90 (Fig. 1) is provided for limiting the backswing of the tone arm. As in the applications of Colin B. Dale, Serial No. 446,469, and the application of Edwin S. Bara, Serial No. 552,827, the indexing assembly 90 includes a flag **90*a* mounted on a shaft 93. The flag 90*a* has an inclined face 91 which may be engaged either by a 10-inch record, indicated by reference numeral 98, or by a 12-inch record, indicated by reference numeral 99. A 7-inch record, such as indicated by reference numeral 97, preferably does not engage the sloping face 91 of the flag 90*a***, and in this connection it should be noted that the tone arm normally is carried inwardly to a position just inside the periphery of a 7-inch record.

The indexing assembly 90 normally rests reproduction of a record tablet in a position in which the flag **90*a* is clear of the periphery of even a 12-inch record. By this arrangement, any record tablet regardless of the size may be removed manually without interference from the flag 90*a*. At the initiation of an automatic cycle of operation, however, the flag 90*a* is automatically moved to the record interference position shown in Fig. 1. If a 10-inch record is dropped, its edge contacts and cams the flag outwardly enough to fall clear of it. The shaft 93 is rotated a predetermined distance by this camming and, consequently, the inward movement of the tone arm is limited by a stepped stop, described clearly in applications Serial No. 446,469 and Serial No. 552,827, in suitable position so that the tone arm is dropped in the proper position for a 10-inch record. Likewise, the dropping of a 12-inch record cams the flag outwardly further than the 10-inch record does and rotates the shaft 93 a greater distance with the result that the travel of the tone arm is limited by a stepped stop in another position and the tone arm is dropped in the proper place to reproduce a 12-inch record. After a record has been deposited on the turntable, the flag 90*a*** is again moved to its outermost position.

At the initiation of each automatic cycle, the cam gear 29 is rotated one full revolution. An undulating groove 43 is formed in the cam gear 29. The groove 43 has an axial component of follower movement as well as a radial component. In the groove 43 rides a cam follower pin 42 which is mounted on the inner end of a rocker arm 44 pivotally mounted on a bracket 47 which in turn is rotatably mounted on a stub shaft 48. The stub shaft 48 is fixedly secured to a reinforcing plate 21 attached to the underside of the motorboard 1. The movement of the pin 42 within the groove 43 provides radial as well as lateral movement of the rocker arm 44 to afford four operations, namely an upward movement to lift the tone arm and clear the turntable; movement of the tone arm radially outwardly to an inoperative or resting position in which another record tablet may be deposited on the turntable by drop mechanism; movement of the tone arm back to a position above the record tablet; and, lowering the arm to its sound reproduction contact with the sound track of the record tablet.

At the outer end of the rocker arm 44 there is formed a lever 104 (see Fig. 1) which is operative to actuate the indexing assembly as the rocker arm 44 moves vertically and horizontally in response to the movement of the pin 42 in the undulating groove 43 in the cam gear 29. To this end, a channel-shaped bracket 96 is mounted upon the shaft 93 and is normally urged into the lower position shown in Fig. 1 by means of a spring 93*a*. A latch or toggle 105 is pivotally mounted on one side of the bracket 96 on a stepped cam plate 89 forming the upper arm of the bracket 96.

The toggle 105 has a shoulder 105*a* which engages the undersurface of the cam plate 89 to prevent counterclockwise rotation of the toggle, as viewed in Fig. 1. On its lower edge, the toggle 105 has a projection 105*b*. As the lever 104 moves upwardly to the response to the movement of the pin 42 in the groove 43 its upturned end 104*a* locks behind the projection 105*b*, and as the lever 104 moves transversely, it urges the bracket 96 in a counter-clockwise direction as viewed from the top in Fig. 1.

This motion is transmitted to the shaft 93 by means of a pin 88 mounted on the top surface of the cam plate 89. The pin 88 is received in a slot formed in the outer end of a crank 87 which is fixedly secured to the shaft 93.

As the flag 90*a* is thus brought to its innermost position, the end 104*a* of the lever 104 slips from under the point of the projection 105*b* and the bracket 96 is again returned to its lower position by the force of the spring 93*a*. If a 10-inch record should be dropped, the impact on the flag 90*a* rotates the shaft 93, and consequently the bracket 96, in a clockwise direction, as viewed from the top in Fig. 1, so that a higher shoulder of the stepped cam plate 89 is presented to interfere with the motion of pin 103 mounted on a lever 63 forming part of the tone arm assembly. As explained before, this shoulder is calibrated so that the tone arm is dropped in the proper position to initiate sound reproduction of a 10-inch record. When the tone arm drops into operative position, the lever 63 also drops to a position in which the pin 103 is out of interfering relation with the cam plate 89, and the tone arm is free to track in the grooves and traverse a record tablet.

As the pin 103 moves into contact with one of the shoulders on the cam plate 89, the lever 104 is moved laterally into contact with the inner face of the projection 105*b*. The toggle 105 is thus rotated in a clockwise direction until the end 104*a* of the lever 104 again assumes a locking relation with respect to the projection 105*b*. As the lever 104*a* moves to the left, as viewed in Fig. 1, it engages a side edge 96*a* of the bracket 96 to rotate the bracket 96, and consequently the flag 90*a* in a clockwise direction, as viewed from the top in Fig. 1, until the flag 90*a* assumes its outer position clear of even the 12-inch records. In the present invention, the speed of the turntable is changed automatically to correspond with the diameter of the record deposited on the turntable. A 7-inch record is conventionally recorded at 45 r.p.m. A large majority of the 10-inch and 12-inch records made today are recorded at 33⅓ r.p.m. Some of the older 10-inch and 12-inch records are recorded at 78 r.p.m. and provision is made for manual control to reproduce these records at their correct speed. This is done by a manual manipulation that does not form a part of this invention but will be described hereafter. By the present arrangement, the turnable speed may be changed from its normal 45 r.p.m. setting to a setting for reproduction at 33⅓ r.p.m. when a 10-inch or 12-inch record is dropped. As pointed out above, the flag 90*a*, at the initiation of each automatic cycle, automatically moves into a position in which the tone arm will be moved inwardly the proper distance to reproduce a 7-inch record at 45 r.p.m.

Figure 3:
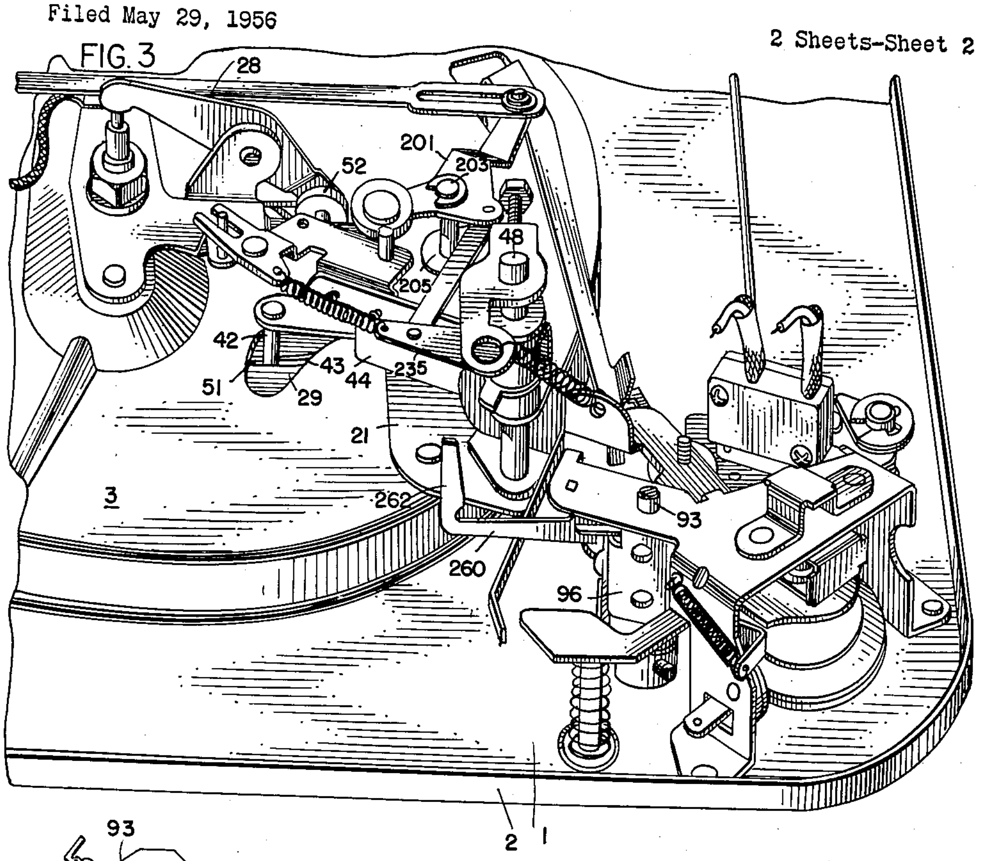
Fig. 3 is a view in perspective of the automatic speed changing mechanism of the present invention shown in operative relation to the tone arm control mechanism and the indexing assembly therefor.

Referring now more particularly to Figs. 2 and 3, there is shown a mechanism for automatically changing the speed of the turntable to rotate a 33⅓ r.p.m. if a 10-inch or 12-inch record strikes the inclined face 91 of the flag 90*a* as it drops onto the turntable, and for changing the speed of the turntable back to 45 r.p.m. at the initiation of each automatic cycle.

The mechanism for accomplishing this speed change includes a bell crank 201 rotatably mounted on a shaft 203 affixed to the plate 21 in spaced relation to the stub shaft 48. To assure movement of the bell crank 201 in a horizontal plane only, a bracket 205 is formed integrally with the bell crank and has a portion extending substantially parallel therewith and apertured for reception of the shaft 203. The bell crank 201 is generally tripartite in construction and includes an elongate arm 207 having an angularly offset portion 209 and an end portion 211 to the outer end of which is secured a pin 213. The pin 213 is received in a slot 215 in a push rod 217 which is effective upon actuation to change the speed of the turntable in a manner hereafter described. The bell crank 201 is further provided with an arm 219 which, in the present instance, has a rotatable washer 221 which is engaged by a mechanism hereafter described for rotation of the bell crank 201 in one direction or the other for movement of the rod 217 to the left, as viewed in Fig. 2, to change the turntable speed setting from 45 r.p.m. to 33⅓ r.p.m. when a record of 10-inch diameter strikes the sloping face 91 of the flag 90*a*, and for movement of the rod 217 to the right, as viewed in the same figure, to change the turntable speed setting from 33⅓ r.p.m. to 45 r.p.m. when a record of 7-inch diameter is dropped upon the turntable. The mechanism for effecting these results will now be described.

Figure 6:
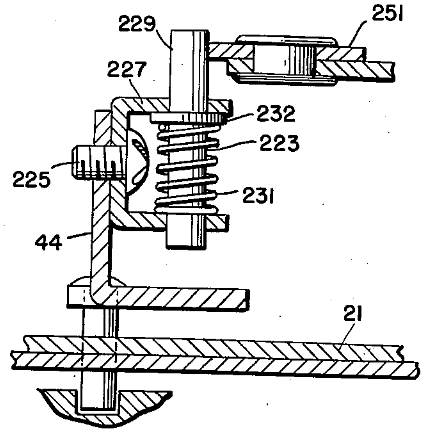
Fig. 6 is a greatly enlarged elevational sectional view taken substantially on line 6—6 of Fig. 2.

Referring now more particularly to Fig. 6, there is shown in this figure a speed control actuator assembly indicated generally by reference numeral 223. The assembly 223 is secured to one side of the inner end of the rocker arm 44 by means of screws 225, and comprises a bracket 227, preferably U-shaped in conformation, and having its free end apertured for reception of a pin 229 which engages the periphery of the washer 221 for rotation of the bell crank 201. The pin 229 is normally urged into the position shown in Fig. 6 by a spring 231, one end of which engages one of the free arms of the bracket 227, and the other end of which abuts against an integrally formed stop 232.

In Fig. 2 is shown the speed-changing mechanism in the position it assumes when the turntable is set for 33⅓ r.p.m. The bell crank 201 is maintained in the position shown by the spring 233 connected at one end to a link 235 which is mounted for rotation on the stub shaft 48, and at the other end to a bifurcated lever 237 pivotally-mounted by means of a pin 239 to an arm 241 forming an extension of the upper arm of the U-shaped bracket 227. A link 243 connects the link 235 with an arm 245 on the bell crank 201.

Upon rotation of the rocker arm 44 in a clockwise direction, as viewed in Fig. 2, the pin 229 is moved in a counter-clockwise direction about the periphery of the washer 221, which is urged into engagement therewith by the spring 233. As the arm 241 moves with the rocker arm 44, tension is exerted on the spring 233 to urge the washer 221 into engagement with the pin 229. For this purpose, a pin 249, which is secured to a bracket 251 forming a part of the plate 21, is received within the bifurcated end of the lever 237. When the rocker arm 44 reaches the limit of its oscillation about the axis of the stub shaft 48, it is then rocked about a perpendicular axis in response to the contour of the groove 43 of the cam gear 29. As a result, the pin 229 is raised out of engagement with the washer 221 to afford a sudden snapping action of the bell crank 201 about its axis of rotation. The pin 229 is again brought into engagement with the arm 219 and the washer 221 when the adjacent end of the rocker arm 44 is moved downwardly in response to the contour of the groove 43. The resilient mounting of the pin 229 permits initial downward movement when the arm 219 is in interfering relation. When the edge of the washer 221 is cleared, the pin 229 snaps into position for engagement with the periphery of the washer. By this arrangement, the rocker arm 44 through the medium of the pin 229 rotates the bell crank 201 in one direction or the other to move the lever 217 to the right or left, as viewed in Fig. 2, depending upon the position of the bell crank 201 when the pin 229 is brought into engagement with the washer 221, to change the speed of the turntable to correspond to the requisite reproducing speed of a record dropped upon the turntable. The direction of rotation of the bell crank 201 is dependent upon the position of the bell crank when the pin 229 is oscillated in a clockwise direction, as viewed in Fig. 2. The mechanism for determining the position of the bell crank 201 will now be described.

Figures 4, 5:
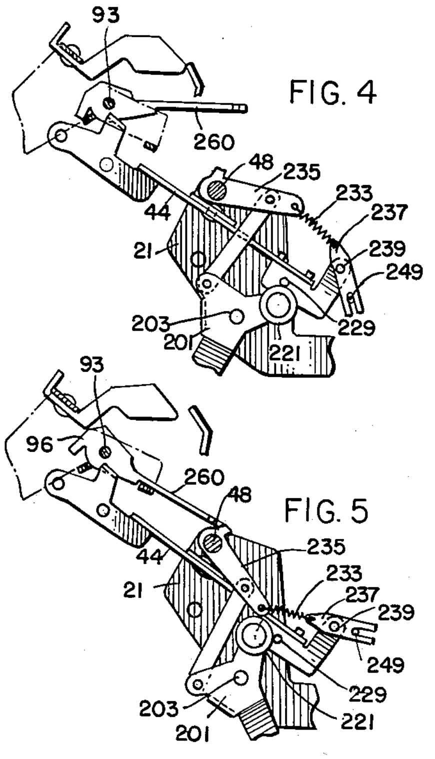
Fig. 4 is a fragmentary bottom plan view of the automatic speed changing mechanism in the position it assumes when a record of larger diameter is dropped upon the turntable.
Fig. 5 is a view similar to Fig. 4 but showing the automatic speed changing mechanism in the position it assumes when a record of smaller diameter is deposited on the turntable.

Referring now to Figs. 3, 4 and 5 an arm 260 extends outwardly from the bracket 96 and has a depending portion 262 which in the innermost position of the flag 90a is brought to the position shown in Fig. 5. In this position, rotation of the lever 235 in a counter-clockwise direction, as viewed in this figure, is prevented, and the bell crank 201 assumes a position in which the pin 229 engages the right side of the washer 221 to afford counter-clockwise rotation of the bell crank and movement of the push rod 217 to the right, as viewed in Fig. 2, to change the speed of the turntable to 45 r.p.m. The arm 260 assumes the position shown in Fig. 5 only momentarily, i.e., the length of time that the flag 90a is in its innermost position. During this interval, further rotation of the lever 235 about the axis of the stub shaft 48 is prevented and the pin 229 engages the washer 221 in the position shown in Fig. 5. In the event that a 10-inch record is dropped upon the turntable, the lever 235 may rotate to the position shown in Fig. 4 and the bell crank 201 assumes the position shown in that figure. In this position, the pin 229 engages the other side of the washer 221 and effects clockwise rotation of the bell crank 201 and movement of the push rod 217 to the left, as viewed in Fig. 2, to change the speed of the turntable to 33⅓ r.p.m. The lever 235, of course, is freely rotatable on the stub shaft 48 and, upon oscillation of the rocker arm 44 in a counter-clockwise direction the bifurcated lever 237 is brought to the position shown in Fig. 4 because of the varying relative positions of the pins 239 and 249. In moving to this position, movement of the lever 235 and the bell crank 201 to the positions shown is afforded. When rotation of the lever 235 is precluded by the position of the arm 260 the bifurcated lever 237 assumes the position shown in Fig. 5 and the bell crank 201 is brought to a position in which the right side of the washer 221 is engaged by the pin 229.

Movement of the push rod 217 to the right, as viewed in Fig. 2, effects clockwise rotation of a bell crank 155a, downward movement of a link 156a, clockwise rotation of a link 157a, and similar movement of a link 158a for inward movement of a stepped cam 159, similar to that described in the applications to Dale and Bara. The stepped cam 159 raises or lowers the shaft of a motor 152 for selective engagement of steps of varying diameters on the shaft with a friction wheel (not shown) which drives the turntable. Preferably the steps of the cam 159 are joined by inclined faces to facilitate axial movement of the motor shaft. The lower end of the motor shaft is at all times in engagement with either the cam steps or the inclined faces. Clockwise rotation of the bell crank 155a effects movement of a push rod 150a to the left, as viewed in Fig. 2, to rotate a lever 149a forming part of a speed selector assembly 122 in a counter-clockwise direction to a predetermined position calibrated for 45 r.p.m. on the opposite side of the motor-board.

As set forth above, the arm 260 is brought to the position shown in Fig. 4 when a record of a diameter greater than 7 inches is dropped upon the turntable. This affords rotation of the lever 235 to the position shown in this figure, and the bell crank 201 is brought to a position in which engagement of the washer 221 by the pin 229 effects clockwise rotation of the bell crank and movement of the push rod 217 to the left, as viewed in Fig. 2. The elements 155a, 156a, 157a, 158a, and 150a are moved oppositely and the stepped cam 159 is moved outwardly to a position corresponding to 33⅓ r.p.m. rotation of the turntable, and the lever 149a is returned to the position shown in Fig. 2.

As in the inventions of Dale and Bara, the stepped cam 159 is provided with four steps for rotation at 16 r.p.m., 33⅓ r.p.m., 45 r.p.m. and 78 r.p.m. For rotation of the turntable at 16 r.p.m. and 78 r.p.m. the lever 149a is rotated by a manual control knob (not shown) forming a part of the assembly 122 so that the appropriate steps of the cam 159 are positioned beneath the shaft of the motor.

The present invention is characterized in that the speed of the motor is changed only in the event that the next succeeding record tablet requires such a change. While the indexing mechanism sets the return of the tone arm for reproduction at 45 r.p.m. at the initiation of each automatic cycle, the speed of the turntable is changed only in the event that the next succeeding record is of a different diameter from that just played. For example, should a record of 10-inch diameter be dropped on the turntable, the bell crank 201 will assume the position shown in Fig. 4 and the push rod 217 will be moved to the left to change the speed of the motor to 33⅓ r.p.m. If the next record is also 10 inches in diameter, the position of the stepped cam 159 remains unchanged. If the next record is 7 inches in diameter, the bell crank 201 will assume the position shown in Fig. 5 and the cam 159 will be moved to a corresponding position until a record of a diameter greater than 7 inches is dropped upon the turntable.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. An automatic record changer for the sequential playing of a plurality of records of different diameters comprising a rotatable turntable having means for releasably supporting a stack of record tablets above the turntable and means for dropping one of said tablets on said turntable during each cycle, a tone arm including a transducer adapted for vertical and horizontal swinging movement relative to said turntable, indexing means having a normal position and a position corresponding to each of a plurality of record diameters of records contacting said indexing means, means operable at the beginning of each cycle for operating said indexing means to the position corresponding to the smallest diameter record tablet in said stack, said means comprising a cam actuated rocker arm having vertical and horizontal movement for raising said tone arm and swinging said tone arm to an inoperative position at the initiation of each automatic cycle, said indexing means being operative to limit the backswing of said tone arm to a position corresponding to the diameter of the record tablet dropped on the turntable during a particular cycle, and means operable in response to the position of said indexing means including a crank and a reciprocable member coupled thereto with a lost motion for varying the speed of said turntable to correspond to the requisite reproducing speed of the particular record dropped, said rocker arm driving said crank to reciprocate said member.

2. An automatic record changer for the sequential playing of a plurality of records of different diameters comprising a rotatable turntable having means for releasably supporting a stack of record tablets above the turntable and means for dropping one of said tablets on said turntable during each cycle, a tone arm including a transducer adapted for vertical and horizontal swinging movement relative to said turntable, indexing means having a normal position and a position corresponding to each of a plurality of record diameters of records contacting said indexing means, means operable at the beginning of each cycle for operating said indexing means to the position corresponding to the smallest diameter record tablet in said stack, said means comprising a cam actuated rocker arm having vertical and horizontal movement for raising said tone arm and swinging said tone arm to an inoperative position at the initiation of each automatic cycle, said indexing means being operative to limit the backswing of said tone arm to a position corresponding to the diameter of the record tablet dropped on the turntable during a particular cycle, means reciprocated by said indexing means a limited distance in either direction without varying the speed of said turntable to correspond to the requisite reproducing speed of the particular record dropped, said last-named means being operable in response to the movement of said rocker arm to move said last-named means a further distance to vary the speed of said turntable to the playing speed of the particular record dropped.

3. An automatic record changer for the sequential playing of a plurality of records of different diameters comprising a rotatable turntable having means for releasably supporting a stack of record tablets above the turntable and means for dropping one of said tablets on said turntable during each cycle, a tone arm including a transducer adapted for vertical and horizontal swinging movement relative to said turntable, indexing means having a normal position and a position corresponding to each of a plurality of record diameters of records contacting said indexing means, means operable at the beginning of each cycle for operating said indexing means to the position outside of the smallest diameter record tablet in said stack, said means comprising a cam actuated rocker arm having vertical and horizontal movement for raising said tone arm and swinging said tone arm to an inoperative position at the initiation of each automatic cycle, said indexing means being operative to limit the backswing of said tone arm to a position corresponding to the diameter of the record tablet dropped on the turntable during a particular cycle, and means operable in response to the position of said indexing means for varying the speed of said turntable to correspond to the requisite reproducing speed of the particular record dropped, said last-named means comprising a mechanism including a bell crank rotatably mounted in the path of travel of said rocker arm, said bell crank being selectively positionable by said indexing means so that it is rotated by the movement of said rocker arm in one direction or the other to decrease or increase the speed of the turntable.

4. An automatic record changer for the sequential playing of a plurality of records of three different diameters, comprising a rotatable turntable having means for releasably supporting a stack of record tablets above the turntable and means for dropping one of said tablets on said turntable during a cycle, a tone arm including a transducer adapted for vertical and horizontal swinging movement relative to said turntable, indexing means having a normal position and a position corresponding to each of a plurality of record diameters of records contacting said indexing means, means for changing the speed of said turntable to correspond to the requisite reproducing speed of a record tablet of a particular diameter, means operable at the beginning of each cycle for operating said indexing means to the position overreaching the middle size diameter record tablet but clearing the smallest tablet in said stack and for setting the speed of said turntable to the requisite speed of said smallest diameter record tablet, said means comprising a cam actuated rocker arm having vertical and horizontal movement, said rocker arm being further operative upon actuation to raise said tone arm and swing said tone arm to an inoperative position at the initiation of each automatic cycle, said indexing means being operative to limit the backswing of said tone arm to a position corresponding to the initial reproducing position of a record tablet of larger diameter in the event that such a record is dropped on the turntable during a particular cycle, said speed changing means including a lost motion reciprocating element operative in response to the limit position of said indexing means to change the speed of the turntable to correspond to the two requisite reproducing speeds of the larger record and tablets including a reciprocable member engaging said reciprocating element and movable by said indexing means a partial distance within the distance of the lost motion of said reciprocating element past an intermediate position and means driven by said operable means for urging said reciprocable member the remaining distance to actuate said lost motion reciprocating element.

5. In a record changer having automatic cycles for the sequential playing of a plurality of record tablets of different diameters, a rotatable turntable having means for releasably supporting a stack of record tablets above the turntable during each cycle, a tone arm including a transducer adapted for vertical and horizontal swinging movement relative to said turntable, the combination of indexing means having a normal position and a position corresponding to each of a plurality of record diameters of records contacting said indexing means, means operable at the beginning of each cycle for operating said indexing means to the position corresponding to the smallest diameter record tablet in said stack, means actuated by said indexing means for urging said tone arm into an initial reproducing position corresponding to the diameter of the record tablet dropped on the turntable during a cycle, a speed changing mechanism driving said turntable, and means operable in response to the position of said indexing means for varying the speed of said turntable to correspond to the requisite reproducing speed of the record dropped, said last-named means comprising a lost motion element operating said mechanism, a bell crank selectively positionable by said indexing means without moving said element, and a member driven by said turntable for operating said bell crank so that the speed of the turntable is changed in the event a record differs in diameter from the next previous record dropped.

6. An automatic record changer for the sequential playing of a plurality of records of different diameters comprising a rotatable turntable having means for releasably supporting a stack of record tablets above the turntable and means for dropping one of said tablets on said turntable during each cycle, a tone arm including a transducer adapted for vertical and horizontal swinging movement relative to said turntable, indexing means having a normal position and a position corresponding to each of a plurality of record diameters of records contacting said indexing means, means operable at the beginning of each cycle for operating said indexing means to the position corresponding to the smallest diameter record tablet in said stack, said means comprising a cam actuated rocker arm having vertical and horizontal movement for raising said tone arm and swinging said tone arm to an inoperative position at the initiation of each automatic cycle, said indexing means being operative to limit the backswing of said tone arm to a position corresponding to the diameter of the record tablet dropped on the turntable during a particular cycle, and means operable in response to the position of said indexing means during said backswing for varying the speed of said turntable to correspond to the requisite reproducing speed of the particular record dropped, said last-named means including a bell crank positioned by said indexing means and adapted to be rotated by said rocker arm in one direction or the other depending upon the positioning thereof by said indexing means.

7. In an automatic record changer having a rotatable turntable for receiving records thereon in playing position, means for supporting at a point spaced from said turntable a stack of intermixed records of different diameters having different playing speeds related to said diameters, means for moving said records from said stack successively one at a time to said playing position along a predetermined path, means for selectively rotating said turntable at said different speeds including a speed change control element, means engaged by records of predetermined sizes in said path, and means for actuating said control element to change said speeds including a lever movable to two alternate positions in response to the position of said record engaged means and coupled on one arm to said element with a lost motion coupling and carrying on the other arm a roller, means driven by said turntable for vertical movement and lateral movement towards the pivotal axis of said lever to engage the roller to pivot the lever beyond said predetermined positions to activate said control element, said last means including a vertically movable pin normally urged to engage said roller.

8. In a record changer having automatic cycles for the sequential playing of a plurality of record tablets of different diameters, a rotatable turntable having means for releasably supporting a stack of record tablets above the turntable and means for dropping one of said tablets on said turntable during each cycle, a tone arm including a transducer adapted for vertical and horizontal swinging movement relative to said turntable, the combination of indexing means having a normal position and a position corresponding to each of a plurality of record diameters of records contacting said indexing means, means operable at the beginning of each cycle for operating said indexing means to the position corresponding to the smallest diameter record tablet in said stack, means actuated by said indexing means for urging said tone arm into an initial reproducing position corresponding to the diameter of the record tablet dropped on the turntable during a cycle, and means operable in response to the position of said indexing means for varying the speed of said turntable to correspond to the requisite reproducing speed of the record dropped, including a reciprocable speed change element moved a partial distance in either direction past an intermediate position by said indexing means, and means driven by the last mentioned operable means for urging said speed change element the remaining distance.

9. In a record changer having automatic cycles for the sequential playing of a plurality of record tablets of different diameters, a rotatable turntable, means for releasably supporting a stack of record tablets above the turntable, cycling means actuated at the end of the playing of a record, means actuated by said cycling means for dropping one of said tablets on said turntable during each cycle, a tone arm including a transducer adapted for vertical and horizontal swinging movement relative to said turntable, the combination of indexing means having a normal position and a position corresponding to each of a plurality of tablet record diameters of record tablets contacting said indexing means when dropped on said turntable, means operable by said cycling means at the beginning of each cycle for disposing said indexing means in a position corresponding to the smallest diameter record tablet in said stack, means actuated by said cycling means and controlled by indexing means for urging said tone arm into an initial reproducing position corresponding to the diameter of the record tablet dropped on the turntable during a cycle, and means responsive to the position of said indexing means for varying the speed of said turntable to correspond to the requisite reproducing speed of the record dropped including a reciprocable speed change element moved a partial distance in either direction past an intermediate position by said indexing means, and means driven by said cycling means for urging said speed change element the remaining distance.

References Cited in the file of this patent

UNITED STATES PATENTS

| | | |
|---|---|---|
| 2,090,746 | Compare | Aug. 24, 1937 |
| 2,113,401 | Goldsmith | Apr. 5, 1938 |
| 2,632,650 | Offutt | Mar. 24, 1953 |
| 2,652,258 | Dale | Sept. 15, 1953 |
| 2,673,089 | Osborne | Mar. 23, 1954 |
| 2,752,159 | Bacher | June 26, 1956 |